United States Patent
Govindaraju et al.

(10) Patent No.: US 8,605,578 B1
(45) Date of Patent: Dec. 10, 2013

(54) SYSTEM AND METHOD FOR HANDLING OF DESTINATION HOST SIDE CONGESTION

(75) Inventors: Rama K. Govindaraju, San Jose, CA (US); Peter Hochschild, New York, NY (US); Rajeev Sivaram, San Jose, CA (US); Sridhar Raman, Cupertino, CA (US)

(73) Assignee: Google Inc., Mountain View, CA (US)

( * ) Notice: Subject to any disclaimer, the term of this patent is extended or adjusted under 35 U.S.C. 154(b) by 232 days.

(21) Appl. No.: 13/115,299

(22) Filed: May 25, 2011

(51) Int. Cl.
*H04J 1/16* (2006.01)
*H04J 3/14* (2006.01)
*H04L 1/00* (2006.01)
*H04L 12/26* (2006.01)
*H04L 12/28* (2006.01)
*G01R 15/16* (2006.01)

(52) U.S. Cl.
USPC ........... 370/229; 709/213; 709/232; 370/242; 370/394

(58) Field of Classification Search
USPC .......... 709/201–213, 232; 370/230, 389, 392, 370/393, 394, 395.1, 411, 412, 413, 415, 370/417, 470–476, 229, 231
See application file for complete search history.

(56) References Cited

U.S. PATENT DOCUMENTS

| | | | | |
|---|---|---|---|---|
| 5,243,596 | A * | 9/1993 | Port et al. | 370/231 |
| 7,050,437 | B2 * | 5/2006 | Bilic et al. | 370/394 |
| 7,212,538 | B2 * | 5/2007 | Abrol et a | 370/412 |
| 7,630,307 | B1 * | 12/2009 | Akinpelu et al. | 370/229 |
| 7,899,925 | B2 * | 3/2011 | Ghose et al. | 709/232 |
| 2006/0045011 | A1 * | 3/2006 | Aghvami et al. | 370/230 |
| 2010/0329275 | A1 * | 12/2010 | Johnsen et al. | 370/412 |

* cited by examiner

*Primary Examiner* — Xavier Szewai Wong
*Assistant Examiner* — Peian Lou
(74) *Attorney, Agent, or Firm* — Lerner, David, Littenberg, Krumholz & Mentlik, LLP

(57) ABSTRACT

Systems and methods are provided for managing congestion at a destination host in a network. A transport layer system manages receive buffer for application processes running on the destination host. Upon receiving the first packet of a new message from a source host, the system determines if there is enough free space in the receive buffer at the destination host to be reserved for the entire message. The system allocates receive buffer for the entire message if there is enough free receive buffer space. If there is not enough free buffer space, the system drops the message and sends a negative acknowledgment to the source host. The source host pauses transmission to the destination host upon receiving the negative acknowledgment. The system sends a resume message to the source host when there is enough free buffer. The source host retransmits the dropped message upon receiving the resume message.

22 Claims, 7 Drawing Sheets

SYSTEM AND METHOD FOR HANDLING OF DESTINATION HOST SIDE CONGESTION

BACKGROUND OF THE INVENTION

In a distributed system including nodes (henceforth called network nodes) connected via a communications network, applications that run on the network nodes communicate with each other by sending and receiving messages over the communication network. A portion of memory in the applications' address space on the network node it is running on is used as a receive buffer region for receiving the incoming packet data for the application. The received messages wait in the buffer to be processed by the application process that the message is destined for. The receive buffer region may be divided on a per application process basis. Since an application process may communicate with many other application processes running on other network nodes at a given time and receive messages from these other application processes, the receive buffer associated with the application process is thus shared by all the incoming messages destined for an application process.

Efficiently allocating the receive buffers on a network node present many challenges. These challenges include, for example, determining the size of the receive space that should be reserved, what remedial actions should be taken upon a no-free-buffer condition, and the potential effect of one congested process on other non-congested processes. Receive buffers may also be allocated dynamically.

Dynamic allocation grows the receive buffer on a needed basis. Complexity in the allocation may increase along with application computations. Thus, applications may need to perform complex buffer management of the receive space with this approach.

Fixed allocation of a reasonably small sized constant buffer size provides a viable solution. The amount to allocate may be based on expected performance of the application, size and number of expected incoming messages (sometimes called the working set). However, deciding on the appropriate size of the receive buffer presents a difficult choice. For example, allocating too little receive space may result in poor performance and more congestion, allocating too much space may result in low utilization, allocating on a worst case basis may turn out to be a non-scalable solution and may also result in poor utilization. Moreover, fixed allocation should reflect the priority of the processes, the typical working set size, as well as their respective typical or average message sizes that need to be placed into the buffer.

A credit-based solution allocates the receive space as a credit limit to each source sending process. The entire receive space is divided per potential source processes that may send messages to the receiving process. The sending process at the source host keeps track of how much in-flight data it has pending (not acknowledged) between it and all the destination hosts. It does not allow more data than what the credit permits to be in-flight per source-destination pair. The source sending process may not fully utilize the assigned credit limit. The drawback of this approach is that if a receiving process receives messages from only a small number of source processes at any given time, much of the receive buffer space will be poorly utilized most of the time.

In rendezvous based systems, a sending side sends an envelope of a message to be sent to the receiving side. The envelope contains information regarding the message. The receiving side sends a message back to the sending side when the receiving side is ready to receive and has reserved buffer space for the expected message. As such, extra round-trip overhead is incurred for each message transmitted and extra state information is kept on both sides impacting latency and overall performance of the system.

In application level acknowledgment protocol, an application process drops an incoming message and sends a negative acknowledgment to the sending side when the receive buffer space is all in use (i.e. full). The sending side takes appropriate recovery actions based on the negative acknowledgment and resumes transmission upon a notification from the destination side that it is safe to resume sending. This scheme requires the application to be involved in the flow control and buffer management of the receive space and also requires that the messages be held for a longer time by the application on the send side for potential retransmission later.

In a timeout based system, the transport layer on the receiving side discards a packet if the destined application process neither processes nor acknowledges the message above a timing threshold. The sending side continues retransmitting the packet unless an acknowledgment is received.

SUMMARY OF THE INVENTION

Aspects of the invention provide systems and methods for congestion control in a data communications network.

In one embodiment of the invention, a computer-implemented method for congestion control in a data communications network is provided. The method comprises receiving at an endpoint, a first arrived packet of a message for a communication handle associated with the endpoint. Each packet of the message contains message size information and information of the communication handle. A processor of the endpoint determines, based on the message size information of the first arrived packet, whether a receive memory buffer associated with the communication handle has enough free space to store the message. The processor also allocates buffer space in the receive memory buffer when the receive memory buffer has enough free space to store the message, and accepts the first arrived packet and other packets of the message into the allocated buffer when the receive memory buffer has enough free space to store the message.

In another embodiment of the invention, a computer-implemented method for congestion control in a data communications network is provided. The network includes an endpoint on a transport layer on a network node. The method comprises sending a message from the endpoint to a communication handle associated with another network node. Each packet of the message contains message size information. The method also comprises receiving first data at the endpoint indicating a receive memory buffer associated with the communication handle has no free space to store the message. The method further comprises pausing data transmission from the endpoint to the communication handle upon receiving the first data, receiving second data at the endpoint indicating the receive memory buffer has enough free space to store the message, and resuming the data transmission to the communication handle upon receiving the second data.

In a further embodiment of the invention, a system for congestion control in a data communications network is provided. The system comprises a receive memory buffer for receiving data sent to a first communication handle associated with an endpoint on a transport layer on a network node in the communications network. The system also comprises a processor on the network node, and a memory coupled to the processor. The processor is configured to execute a set of instructions stored in the memory to send a message to a second communication handle associated with another network node. Each packet of the message contains message size information. The processor is also configured to receive first data at the endpoint indicating a receive memory buffer associated with the second communication handle no free space to store the message, and pause data transmission to the second communication handle upon receiving the first data. The processor is further configured to receive second data at the endpoint indicating the receive memory buffer has enough free space to store the message, and resume the data transmission to the second communication handle upon receiving the second data.

In yet another embodiment of the invention, a computer-implemented method of congestion control in a data communications network is provided. The network includes an endpoint on a transport layer on a network node. The endpoint is associated with an instance of an application process. The method comprises receiving, at the endpoint, a first arrived packet of a message for the instance of the application process from the endpoint. Each packet of the message contains message size information and information of the communication handle. The method also comprises detecting, upon receiving the first arrived packet, whether there is congestion on the network node; and accepting the message when there is no congestion.

In a further embodiment of the invention, a destination congestion management system includes a first endpoint on a transport layer of a first network node, and a second endpoint on the transport layer of a second network node. The first and second endpoints communicate via a transport channel for data transmission therebetween. The second endpoint is associated with a communication handle. The system also comprises a first processor on the first network node and a first memory coupled to the first processor. The first processor is configured to execute a set of instructions stored in the first memory to pause data transmission to the communication handle upon receiving first data at the first endpoint, and resume data transmission to the communication handle upon receiving second data at the first endpoint. The system also comprises a communication interface for receiving, at the second endpoint, a first arrived packet of a message transmitted from the first endpoint to the communication handle, where each packet of the message contains message size information and information of the communication handle, a second processor coupled to a receive memory buffer on the second network node, and a second memory coupled to the second processor. The second processor is configured to execute a set of instructions stored in the second memory to determine, based on the message size information of the first arrived packet, whether the receive memory buffer has enough free space to store the message. If the receive memory buffer has enough free space to store the message, the second processor is configured to allocate buffer space in the receive memory buffer, and accept the first arrived packet and other packets of the message into the allocated buffer. If there is not enough free space in the receive memory buffer to store the message, the second processor is configured to drop the message, send the first data to the first endpoint, and send the second data to the first endpoint when the receive memory buffer has enough free space to store the dropped message.

DETAILED DESCRIPTION

In accordance with aspects of systems and methods, congestion is managed at a destination host in a network. On the destination host, a transport layer endpoint is associated with a communication handle, which is associated with a receive memory buffer for receiving data. The communication handle represents an application process running on the destination host. The destination transport endpoint communicates with a source transport endpoint on a source host over a transport channel in the network. Upon receiving a firstly arrived packet of a new message sent to the communication handle from the source transport endpoint, the system determines, based on the message size information in the packet, if there is enough free space in the receive buffer associated with the communication handle at the destination host for the entire message. The system reserves space in the receive buffer for the entire expected message and accepts the first packet and subsequent packets of the message into the buffer if it determines that there is enough free buffer for the whole message. The first packet of a message that arrives at the destination host may not be the first packet of the message sent by the source (packets may be re-ordered anywhere in transit). If the system determines that there is not enough free buffer space, it drops the packet and sends a negative acknowledgment to the source host for each packet of the message. The system also drops subsequently arrived messages from the source node and other source hosts and negatively acknowledges each dropped message from that user level connection. These source hosts pause sending packets of the discarded messages and do not start sending any new messages to the communication handle upon receiving the negative acknowledgment.

The system monitors the size of the receive buffer freed by the application on the destination host and determines if the freed space has become large enough to start receiving new messages from the communication handles that were paused. If there is enough space (determinations may be based on predetermined thresholds), the system sends a resume message to each of the source hosts that has been negatively acknowledged. These source hosts retransmit the previously nacked messages upon receiving the resume message and can start sending new messages to the communication handle.

Figure 1A:
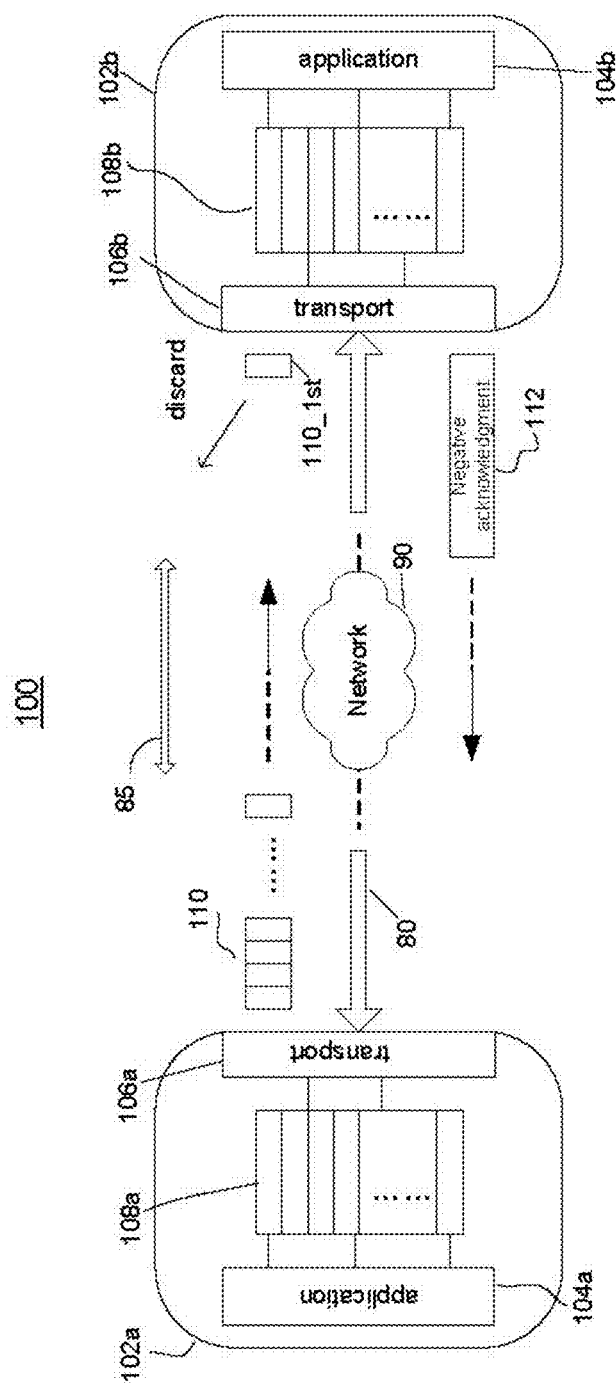
FIG. 1A is a functional diagram of a system in accordance with an aspect of the system and method.

FIG. 1A illustrates a system 100 in accordance with aspects of the invention that includes two network nodes 102a and 102b. The two network nodes communicate over a transport channel 80 through a communications network 90. Although only two network nodes are depicted in FIG. 1A, it should be noted that network 90 may include many network nodes interconnected in a way similar to the system 100 in FIG. 1A.

Each network node may have one or more user applications executing on the network node. Applications on one network node may communicate with applications on remote network nodes through the communications network. For example, application 104a on network node 102a and application 104b on network node 102b may send and receive packets to and from each other over a bi-directional user level connection 85.

On each network node, a portion of memory in the applications' address space may be reserved as a receive buffer to temporarily store the data sent from other network nodes. Data wait in the buffer to be consumed by the application processes for which the data are destined. FIG. 1A illustrates that receive buffers 108a and 108b reside, respectively, on the network node 102a and 102b. According to embodiments of the invention, the receive buffers are managed by the transport layer associated with each network node, such as transport layer 106a and 106b on nodes 102a and 102b in FIG. 1A. Although only one buffer is shown on each network node in FIG. 1A, the illustrated buffer may include one or more buffers and each buffer may associate with an application process.

In system 100, node 102a sends a new message 110 to node 102b. Message 110 may be a single-packet message or a multi-packet message as depicted. Each packet contains information about the message size, so the receiving end 102b may learn the size of the whole message regardless of the arrival order of the 110 message packets.

The transport layer on which nodes 102a and 102b operate may adopt an acknowledgment mechanism where the source side continues retransmitting packets after a predetermined time threshold unless an acknowledgment or a negative acknowledgment or the like is received from the destination side. The transport layer may maintain status tables for all in-flight messages and packets to facilitate detecting transient packet drops and controlling retransmissions. In-flight message refer to those messages with packets being transmitted and in-flight packets refer to those packets not acknowledged yet.

Upon receiving the first arrived packet, e.g., packet 110_1st, the transport system 106b on the receiving end determines if there is enough free space in buffer 108b for message 110 based on the message size information contained in packet 110_1st. If the free space is large enough, the system 106b reserves a portion of buffer 108b that is large enough for the entire message 110. Packet 110_1st, as well as the other packets of message 110, is thus accepted by the receiving end. If there is not enough free space, transport 106b drops packet 110_1st and sends a negative acknowledgment 112 to sending side 102a. The other packets of message 110 will be similarly dropped and a negative acknowledgment is sent for each dropped packet. Once the negative acknowledgment arrives, the sending side pauses sending remaining packets of the discarded message and pauses initiating any new message transfers to the target application process associated with the nacked message, and does not resume sending the dropped packets and the rest of the message (or starting new messages) until a resume notification is received from the destination side 102b.

Figure 1B:
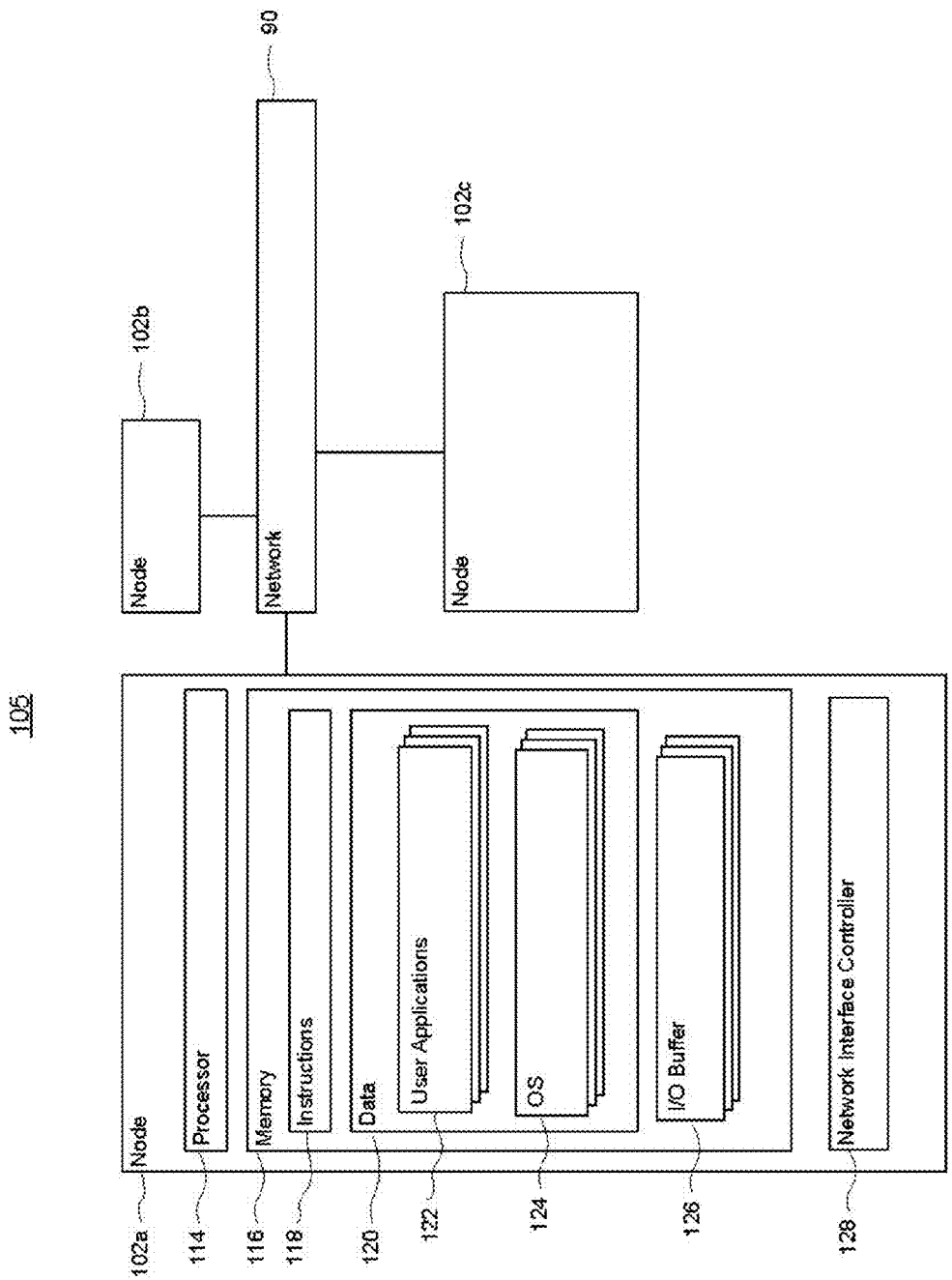
FIG. 1B is a functional diagram of a system in accordance with an aspect of the system and method.

FIG. 1B shows an exemplary configuration 105 of the network node 102a. Network nodes 102a-c may be computers with various application programs running on each respective computer. As illustrated, the computer 102a may be at one node of a network 90 and capable of directly and indirectly communicating with other nodes of the network, such as 102b and 102c. For example, computer 102a may include a web server that is capable of communicating with user computers 102b-c via the network 90 such that server 203a uses network 90 to transmit and provide information to the user computers. Computer 102a may also include a plurality of computers that exchange information with different nodes of a network for the purpose of receiving, processing and transmitting data to the other network nodes.

Network 90, and intervening nodes between node 102a and other network nodes, may include various configurations and use various protocols including the Internet, World Wide Web, intranets, virtual private networks, local Ethernet networks, private networks using communication protocols proprietary to one or more companies, cellular and wireless networks, instant messaging, HTTP and SMTP, and various combinations of the foregoing. Although only a few network nodes are depicted in FIGS. 1A and 1B, it should be appreciated that a typical system can include a large number of connected computers.

Computer network node 102a may contain a processor 114, memory 116 and other components typically present in general purpose computers. Other computers 102b-c may be configured similarly to the computer 102a. The processor 114 may be any brand-name processor, such as processors from Intel Corporation or Advanced Micro Devices. Alternatively, the processor may be a dedicated controller such as an ASIC.

Memory 116 stores information accessible by processor 114, including instructions 118 that may be executed by the processor 114 and data 120. The memory may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. The system and method may include different combinations of the foregoing, whereby different portions of the instructions and data are stored on different types of media.

Although FIG. 1B functionally illustrates the processor and memory as being within the same block, it will be understood by those of ordinary skill in the art that the processor and memory may actually include multiple processors and memories that may or may not be stored within the same physical housing. Accordingly, references to a processor or computer will be understood to include references to a collection of processors or computers or memories that may or may not operate in parallel.

The instructions 118 may be any set of instructions to be executed directly (such as binary machine code) or indirectly (such as scripts from any programming language) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. The instructions may include various programs or functions to perform location estimation for client devices.

Data 120 may be retrieved, stored or modified by processor 114 in accordance with the instructions 118. For instance, although the system and method is not limited by any particular data structure, the data may be stored in computer registers, in a relational database as a table having a plurality of different fields and records, XML documents or flat files. The data may also be formatted in any computer-readable format such as, but not limited to, binary values or Unicode. The data may include any information sufficient to identify the relevant information, such as numbers, descriptive text, proprietary codes, references to data stored in other areas of the same memory or different memories (including other network locations) or information that is used by a function to calculate the relevant data.

The data 120 may include one or more user application programs 122 (for example, application 104a on network node 102a and application 104b on network node 102b in FIG. 1A) that operate in accordance with one or more operating systems 124. The operating systems 124 may be executed by the processor 114 and run the application programs. The operating systems may include any type of operating system. The applications 122 may include any kind of user application programs, for example, a web browser or an Internet map application.

One or more I/O buffer regions 126 may be reserved in the memory 116. These buffer regions may include buffers used for receiving data and sending data. For example, a send buffer may be used to pack user data into a node platform neutral format for the data to be transmitted to a destination host. User application processes may read from and write to the send buffer.

Each network node may include one or more network interface controllers 128. For instance, computer 102*a* may include a network interface controller 128. The network interface controller allows the computer to communicate with other network-capable devices, for example, computers 102*b-c*, over a networking medium such as network 90. The network interface controller 318 may include a hardware device, for example, an Ethernet card, that functions on the physical layer and the data link layer and provides physical access to the networking medium. The network interface controller may also provide a low-level addressing system such as MAC addresses to identify a node in the network.

Operations in accordance with aspects of the invention will now be described with reference to FIG. 2. It should be understood that the following operations do not have to be performed in the precise order described below.

Figure 2:
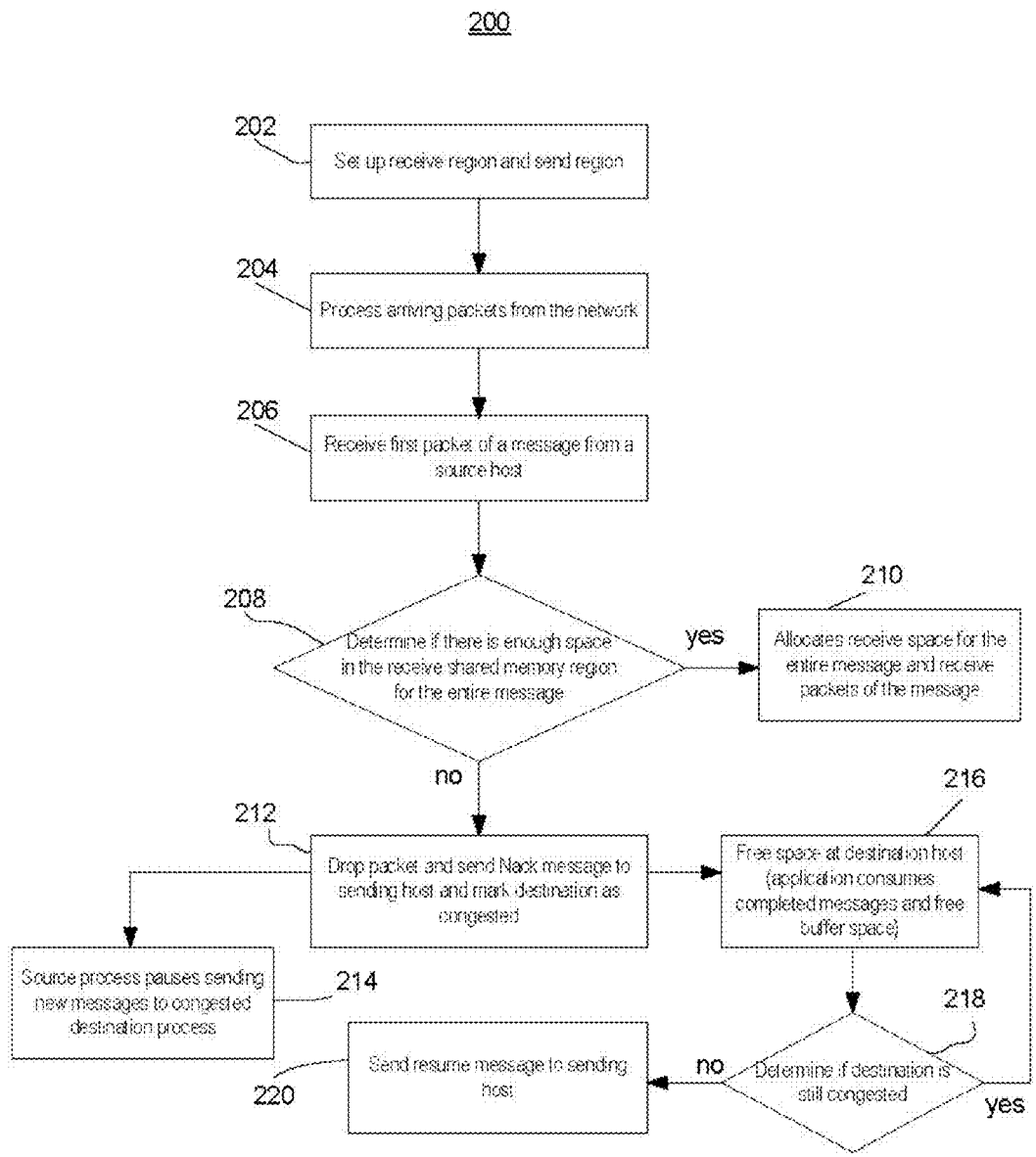
FIG. 2 is a flowchart in accordance with an aspect of the system and method.

FIG. 2 shows a flowchart 200 of a method to manage congestion at a destination host in accordance with an aspect of the system and method. In block 202, a respective receive buffer region and a send buffer region may be set up for the applications running on a destination host. The method to manage the destination host side congestion may begin in block 204, where the destination host at one end of an established connection processes the arriving packets from the network. In block 206, the destination host receives the first arrived packet of a message sent by a source host at the other end of the connection. Then in block 208, the transport system at the receive side determines if there is enough space in the received shared memory region to be allocated for the entire message based on the message size information contained in the packet. If there is enough space, the transport system proceeds to block 210 and allocates receive space for the entire message. If there is not enough space for the entire message, the transport system decides that the receive side is congested. It then drops the first packet and sends a negative acknowledgment message to the send side in block 212 to signal that the connection is congested. The receive side transport system continues to drop all remaining in-flight packets of the dropped message and sends a negative acknowledgment for each of the dropped packet.

The source host continues retransmitting the dropped packets until either an acknowledgment or a negative acknowledgment for the dropped packet is received. Upon receiving the negative acknowledgment, the source host stops transmitting packets of the nacked messages or initiating new messages, in block 214 to the destination host over the user connection on which the negative acknowledgment was received. However, all packets of messages that are already in-flight are allowed to continue because buffer space may have been already reserved for these in-flight messages at the destination host.

In block 216, the received messages at the destination host are continuously harvested by the application process and the buffer space occupied by the harvested message is gradually freed. The transport system at the receive side continually monitors the size of the freed buffer and determines if the receive side is still congested in block 218, and once the freed space is large enough for the discarded message, the transport system sends a resume message to the sending host in block 220. Upon receiving the resume message, the send side resumes transmitting the paused message and other new messages over the connection link.

Figure 3:
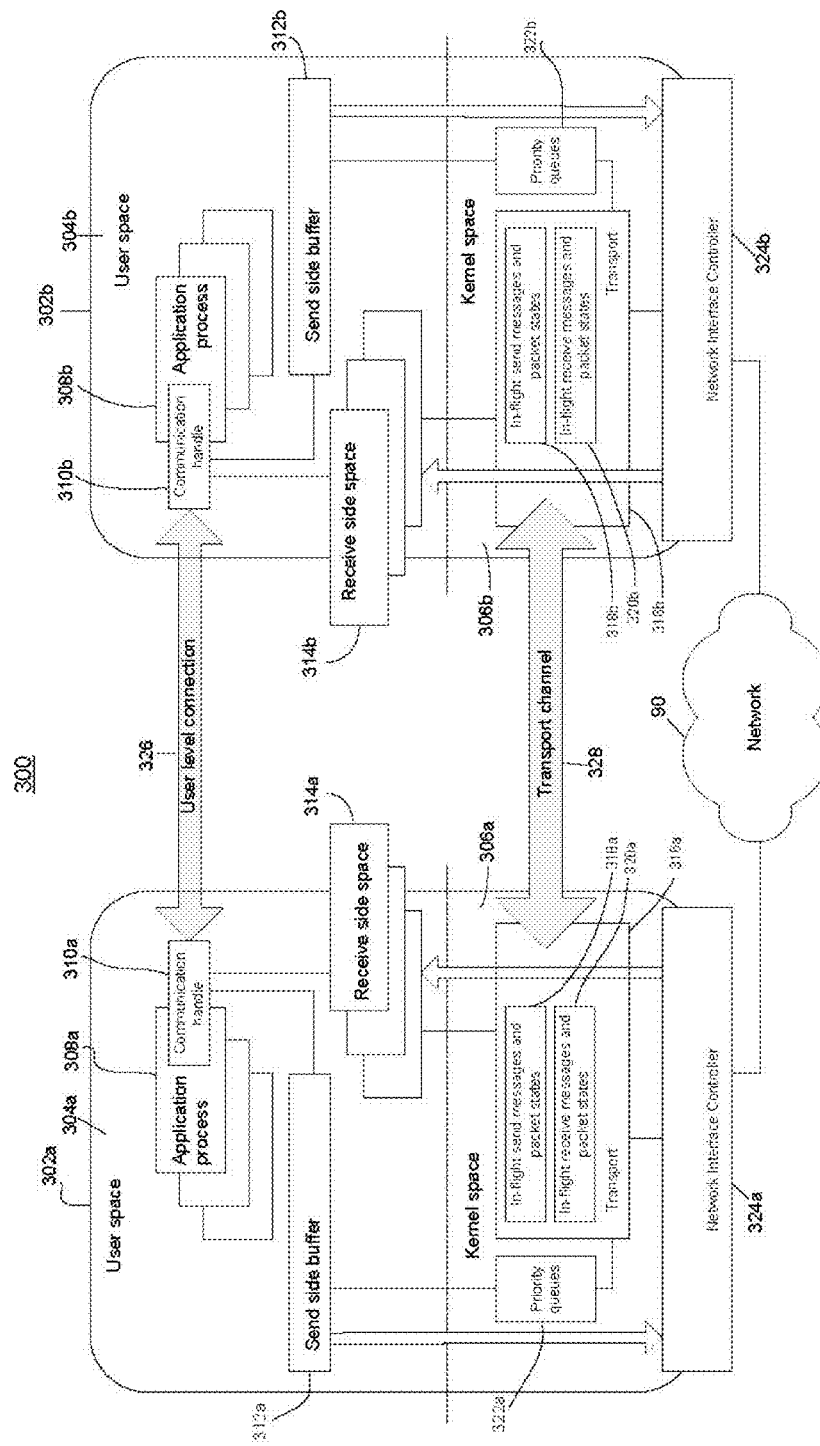
FIG. 3 is a functional diagram of a system in accordance with an aspect of the system and method.

FIG. 3 illustrates a function diagram of another aspect of the system and method. System 300 includes two network nodes 302*a* and 302*b* that are interconnected through network 90. Here, a user level bi-directional connection 326 is established between two communication handles 310*a* and 310*b*, respectively on the two network nodes. A communication handle is a data object used by a transport protocol to represent a communication endpoint. Each communication endpoint may identify a unique endpoint application process or a thread that executes on a network node. Each communication endpoint may originate or receive messages and communicate with a remote communication endpoint through a bi-directional communication channel. As such, each unique communication handle may represent an endpoint communication instance.

Each network node may have multiple application processes running. An application process, for example 308*a* or 308*b*, may create multiple communication endpoints if it exports multiple services to other communication endpoints located in different network nodes. For example, in system 300, the application process 308*a* may use a separate communication endpoint for each service it provides. Furthermore, an application process may use one endpoint for providing a server service and another endpoint for receiving a client service. The number of communication endpoints that an application process may create is subject to resource availability, for example, the memory space that can be allocated to the send buffers 312*a-b*. Each communication endpoint may establish multiple connections, each connecting with a different remote communication endpoint. As to be discussed later, all the connections of a communication endpoint share the same receive buffer region associated with the endpoint.

The transport layer may create a communication handle when an application process makes an open call. A connection call can be made with the transport layer to register with the layer for opening a communication connection with another communication handle. The returned communication handle may be mapped by the operating system to the application process that made the call.

A communication handle may be an object with a two-tuple structure: <IP_address, port>. The IP_address may be the network address of the node where the communication handle resides. The port may be an integer identifier in the port space assigned to a transport protocol domain (e.g., UDP, TCP, etc.) for the respective transport protocol on the network node. For example, a communication handle may be a UDP socket using an UDP port number, or a TCP socket used in a TCP/IP protocol stack, or other objects similar to the concept of a socket used by a network transport protocol. The assignment and management of the IP address and port space may be centralized by some external network entities such as a central administration server.

In addition to the two-tuple structure, the transport system may also return an attribute parameter to define whether the returned communication handle has a "client" or a "server" attribute. The attribute stays the same through the life cycle of the communication handle. A given process may create multiple communication handles with different server/client attributes (for example, one communication handle acting as a server and another communication handle acting as a client). An instance number may be assigned by the transport system to each communication handle and be made monotonically increasing.

A close call may render the handle definition to be deleted and returned to the namespace. Once a communication handle has been returned, the two-tuple definition may be reused by an application process making a subsequent initialization call with a new instance identifier (the identifier number may thus be monotonically increasing). However, the domain of a communication handle is restricted to the process that created it.

Two different communication handles may establish a user level connection and such connection may be embodied in a data object. The connection object may be created upon a Connect call (such as "connect( )" in TCP/IP) specifying the quality of service (QoS) metrics to be used for sending messages over the connection and the remote communication handle address. Such a call may be initiated by a client communication handle. The transport layer may maintain state information of each connection on each network node. Such state information may include, for example, QoS metrics and an instance identification number for the connection. Since a user level connection between two communication handles is bi-directional and each communication handle may send messages according to its own QoS metrics, the QoS information maintained on each end of the connection may be different. The instance number assigned to each connection established between two communication handles may be made monotonically increasing to protect against a stale packet destined for a previous instance of the connection being accepted by a newer instance.

A transport layer channel (such as the transport layer communication channel 328 in FIG. 3) is provided to transmit and re-transmit the packets. An initialization call of a local communication handle to build a user level connection with a remote communication handle may trigger the establishment of a transport channel between the two network nodes if a transport channel has not been established. Generally, this transport channel is hidden from the end user applications.

The transport layer may also implement an acknowledgment mechanism. An acknowledgment or a negative acknowledgment packet is sent and received as part of a sending and receiving loop over a connection channel. Retransmission may be based on a timeout mechanism so packets that have not been acknowledged in at least the timeout duration are resent. The timeout duration may be tunable and may have a default value, e.g., about 100 milliseconds.

Acknowledgments may be sent on the basis of every received packet or on a tunable threshold basis, for example, every 16 packets. Acknowledgments may be piggybacked with the data packets that are sent out. The order of acknowledgment may be based on the order that packets are received and/or the priority information of the packets. The acknowledgment mechanism may also be designed such that under normal conditions, acknowledgments are sent on a receiving basis and if the packets waiting to be acknowledged exceed the threshold, acknowledgments may be sent on a priority basis.

Negative acknowledgments may be sent when a packet has to be dropped and cannot be received by the destination host. A packet may be dropped for various reasons such as an error at the destination application, the channel was not initialized or unavailable, destination not responding, timeout reached, or congestion at the destination host due to no free memory within the receive buffer. The transport protocol may include potential reason code in the negative acknowledgments to facilitate the sending host's adoption of appropriate recovery actions. For example, the sending host may decide to retransmit the dropped packet immediately, to pause transmission of packets to the particular destination host, or to take other recovery reactions based on the potential reason code.

The transport system may also embody various types of end-to-end flow control mechanisms at the packet level and message level, e.g., a sliding window based flow control that bounds the number of in-flight messages/packets between a transport channel. This ensures a reliable transmission of the messages between two endpoints and reduces bursts of traffic and congestion. When a negative acknowledgment reaches a sending host, the transport system may adjust the flow control status of the dropped message and advance the flow control window accordingly, so the dropped message may wait to be retransmitted later, without blocking the transmission of other messages destined for non-congested communication handles. Acknowledgments and negative acknowledgments may be unreliable, so the dispatch of acknowledgments and negative acknowledgments does not need to go through the message and packet level flow control scheme and no packet sequence number is consumed. Acknowledgments and negative acknowledgments are therefore part of side-band communication.

The transport layer may maintain state information about all in-flight packets and messages that each local communication handle sends or receives to facilitate the acknowledgment and flow control. For example, an in-flight receive packet table may be used to maintain the state information for packets that need to be acknowledged based on the acknowledgment threshold. The in-flight send messages and packets may be stored in different send and receive tables, such as tables 318a-b and 320a-b. The transport layer may also maintain a priority queue table, such as 322a, to dispatch the data based on priority information. The priority information may include, for example, QoS level of the messages.

As previously discussed, each network node may reserve certain memory space that functions as buffers for sending and receiving data. For example, network node 302a may have a send buffer region 312a and a receive buffer region 314a. Similarly, network node 302b may have a send side buffer 312b and a receive buffer region 314b.

The transport system may set up the send buffer and the receive buffer for each communication handle at the time when it creates the communication handle in response to an Open call. When the transport protocol returns a communication handle to the application process that initiates the call, it pins and maps a set of send/receive buffer pools to the application process. The application process may specify the required size of the buffer pool in the Open call, or simply accept a default size returned by the transport layer.

The transport layer and the application process that owns the communication handle each has different access level to the send and receive buffers. Specifically, the application process that initiates the call can read from and write to the send buffer. The transport layer may have read-only access to these send buffers.

In an aspect of the system and method, the receive space resources 314a are solely managed by the transport system. The transport layer may write into the receive space and the user application process may have read-only access to the receive space. This access restriction may be useful to prevent any potential crash in the kernel transport that may be caused by a user application process, for example, a damage in the pointer chains caused due to error by the user application process. The transport layer may, handshake, e.g., through appropriate API calls, with the application process on the completion of receiving a message so that the buffers may be reused for subsequent incoming messages. The receive side space 314a-b may also be in user space 312a, as part of the associated communication handle (e.g., handle 310a).

As illustrated, the network interface controllers 324a-b provide physical interfaces for nodes 302-b with the network 90. Each network interface controller may serve as a sending and receiving device for the network node. In an exemplary configuration, a controller may manage a set of kernel buffers for data waiting to be serviced. These buffers may include send buffers to store data waiting to be sent into the network and receive buffers to store the arrived packets of a message waiting to be moved into the receive buffer pool 314a allocated for the message. The priority order of the packets to be serviced may be based on the priority order information in the priority queues 322a.

Figure 4:
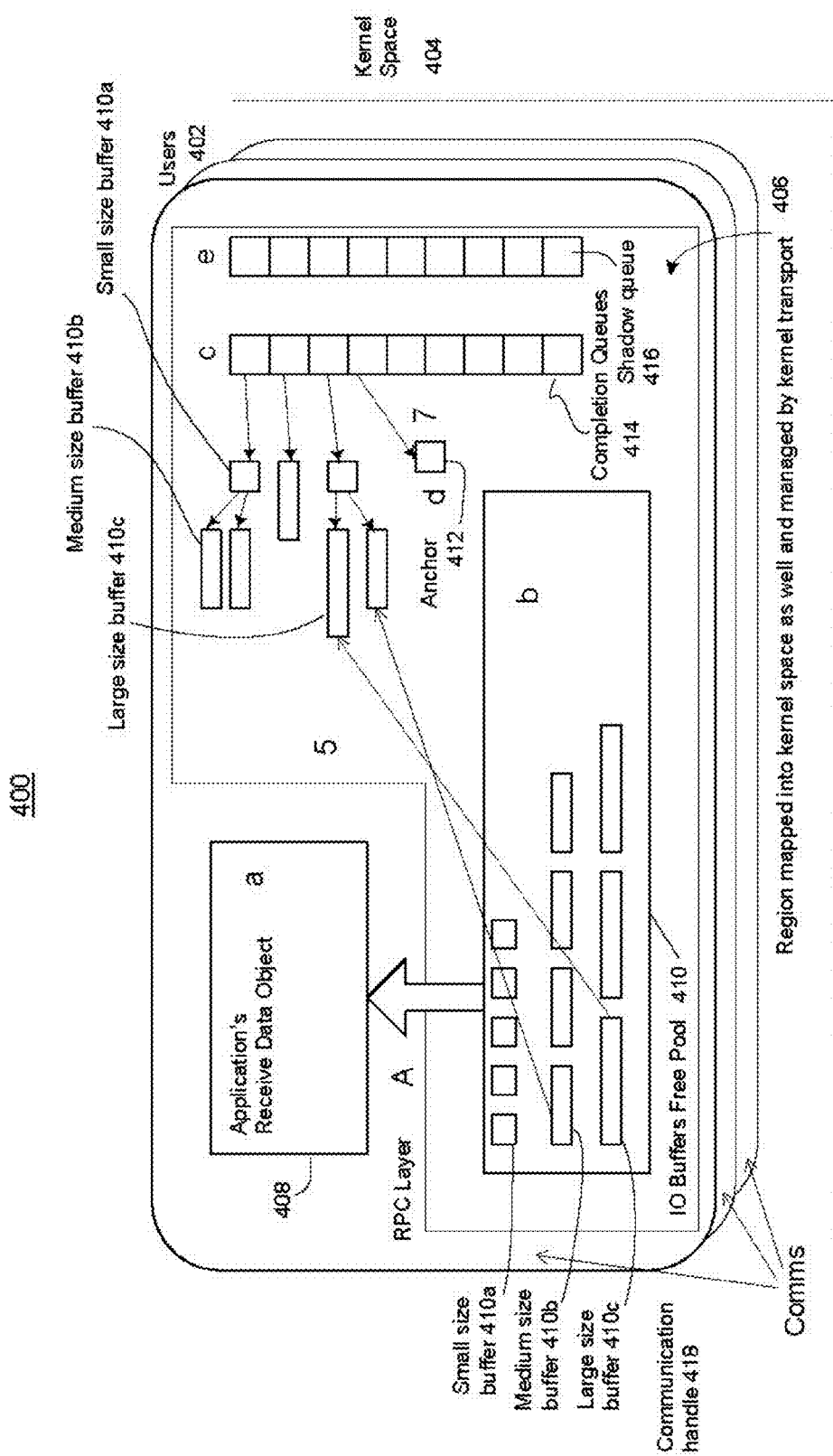
FIG. 4 is a functional diagram of a system in accordance with an aspect of the system and method.

FIG. 4 illustrates potential data structures of an exemplary shared receive region 400 according to embodiments of the invention. Each communication handle created for an application process is associated with such a receive region. As mentioned above, the application process and the kernel transport layer have shared access to the receive region. The application process reads from the region, while the kernel transport layer allocates and writes into the region. The receive region is also shared by the incoming messages from all the connections associated with the communication handle.

As illustrated, the shared receive region 406 may include data structures such as application data objects 408, one or more buffer pools 410, anchors 412 and completion queues 414-416. These data structures may be used to temporarily store messages, harvest completed messages into the user application and release freed buffers back to the transport system. For example, completion queues may be used to handshake between the user process and the transport for messages that have been completed by the transport and are waiting for the user application process to absorb into its ongoing computation. Completion queues may also be used by the application process to notify the transport that messages have been absorbed and the freed buffers can be reused by the transport for subsequent messages. Although not shown, various other types of data structures to facilitate receiving data and absorbing data for application process may also be constructed on the receive side.

The shared receive region 406 may be accessible by the application process and the transport layer. The application process may have read access to receive region 406, and the transport layer has read/write access to the region. As discussed above, setup of the receive side resources in the shared region may be performed on a per communication handle basis. When a user application process makes an initialization call to instantiate a communication handle, it registers with the transport layer and receives a communication handle, e.g., communication handle 418.

At the same time, the transport system sets up buffer resources for the newly created communication handle. For example, send buffers 312a or 312b in FIG. 3 are pinned and mapped to the user space, and will be managed by the application process that owns the returned communication handle. The transport system also sets up a receive region such as region 406 that includes user buffer pool 410, a completion queue 416 and an anchor 412. The receive region is then mapped to the kernel space of the network node, such as space 404, on the network node. The transport system solely performs management functions of the shared receive region, like allocation, book-keeping and freeing of the receive buffer pool through handshaking with the application process that owns the communication handle. As illustrated, each communication handle is thus associated with a set of receive resources upon its creation by the transport system. Since each communication handle may have more than one connection to communicate with other remote communication handles, all these connections share the receive resources allocated for that particular communication handle.

Thus, according to an aspect of the system and method, the transport layer sets up a receive buffer region for each communication handle of an application process so that all the connections associated with each communication handle share the same receive buffer region and management of the buffer region is centralized at the transport layer. This design takes advantage of the fact that although a large number of connections (e.g., thousands) may have been established for a given application process, the working set of active connections at a given instance of time is usually much smaller (e.g., hundreds). By making the buffer size requirements independent of either the scale of the system or the number of connections associated with each application process, the invention significantly improves the receiver buffer utilization and enables a more scalable network design without requiring the user application to be involved in the receive buffer management.

Furthermore, by associating the receive buffer resource with each communication instance, the congestion due to one application process (or a communication handle) being unable to keep up with incoming traffic does not stall other traffic destined for other processes on the same network node or other communication handles associated with the same application process. By centralizing the management function to the transport system and granting the application process with only read access to the receive region, the receive buffer management becomes transparent to the application processes.

An I/O buffer pool 410 may include a number of buffers with different sizes. By way of example, buffer 410a may have a cache line size, buffer 410b may have a maximum transmission unit size, and buffer 410c may have a jumbo frame size. The use of multiple sizes may help with efficient utilization of the buffer. The sizes of the buffer in a receive region may be chosen to be compatible with the traffic pattern of the application. The transport layer performs allocation of these buffers for a message upon receiving the first packet of the message.

An anchor 412 may be used for each message and may be accessed when the remaining packets of the message arrive. Each anchor may include information such as the size of the message, pointers to the list of buffers into which the packets of the message has been assembled into, and the lengths of these buffers. The receive message table may be updated with the anchor pointer so that the subsequent packets of the message may be placed into their target location in the buffer. A lookup of the anchor and some offset operations may be performed to determine which buffer/offset the payload of a packet must be unpacked into. When all of the expected packets of a message are accepted into the buffer and the whole message is formed, the transport layer completes the message by adding the anchor of the message to an entry in a queue that is shared by all the completed messages, such as completion queue 414. Thus each entry in the completion queue points to an anchor of a completed message. Once a message is completed in this way, the messages wait to be harvested by the corresponding application process for use in ongoing computations.

The order of the harvesting may be different from the order in which the completions were enqueued. For example, it is possible that different threads of a user application pick up different anchors and absorb them in a different order. Once a message is absorbed, the order that the buffers of the absorbed message may be returned by the application to the transport may also be different. In these situations, separate completion queues for pending and post application processing enable the above operations to be flexibly performed in any order.

Completion queues may operate in two modes. The destination application process may poll completion queues periodically for completed messages. Alternatively, a completion event signal may be triggered upon the addition of an anchor to the queue. The completion event signal notifies the destination application process that one or more messages are ready to be harvested.

The application process may use various intermediate data structures, such as a shadow completion queue 416, to maneuver the completed messages and to return the harvested messages back to the transport protocol via the shadow completion queue 416. The transport system then reclaims the buffers that have been occupied by the harvested messages and adds these buffers back to the free pool. Generally, the application process that owns the particular communication handle associated with the shared region 406 has only read access to the shared region. However, write access to the shadow completion queue may be provided by the transport protocol to the application process, for example, upon an API call to return the anchor of the harvested message. Application's receive data object 408, which is managed entirely by the application process in the user space 402, is the final destination of the received messages before they are incorporated into the application. The use of separate completion queues for pending and post application processing (e.g., completion queue 416 for pending user application processing and completion queue 418 for post application processing) allows for the handshake between the transport and the user to be performed in a lock-free manner and in a pure producer/consumer fashion.

Figure 5:
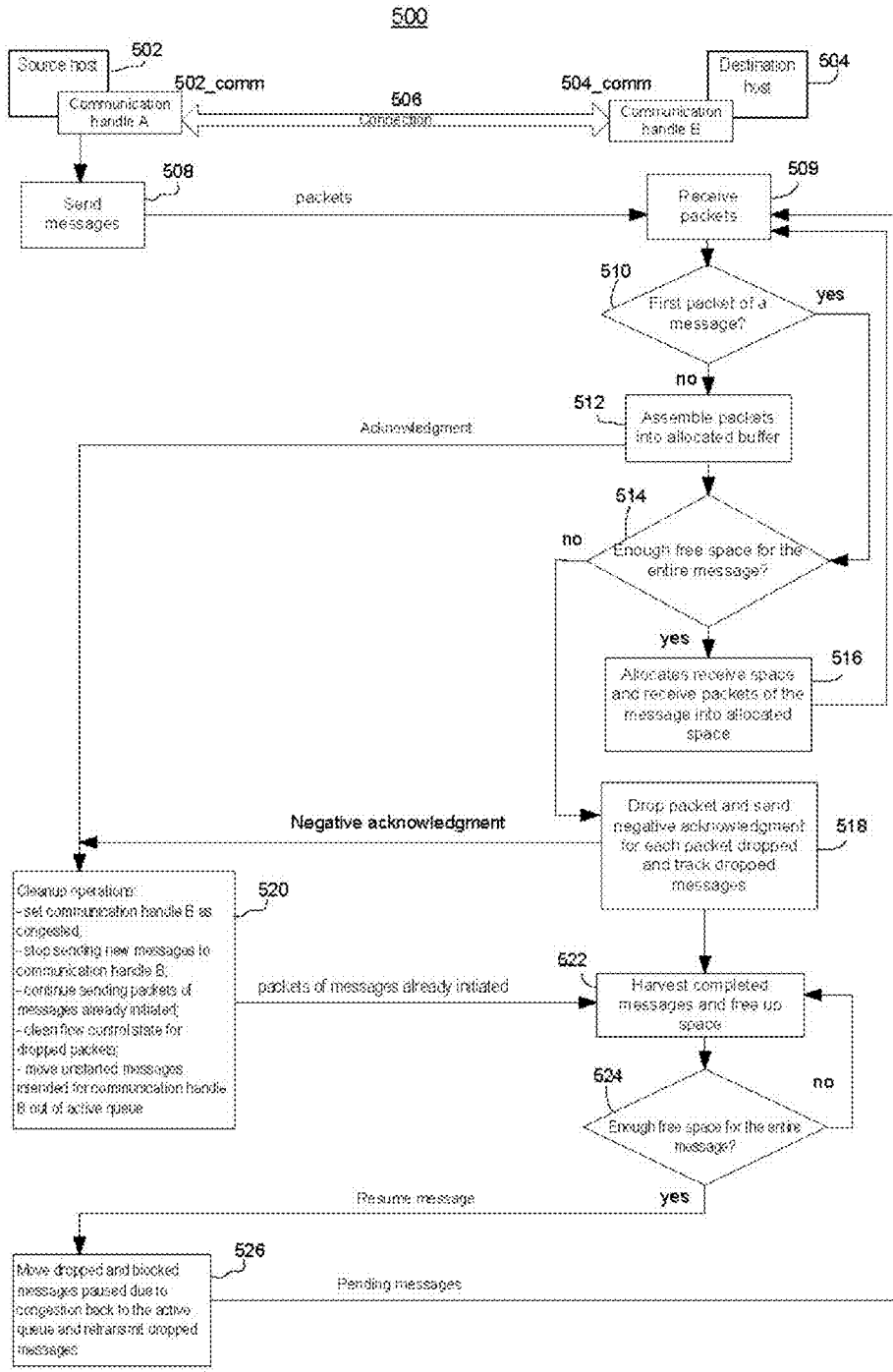
FIG. 5 is a network flow diagram in accordance with an aspect of the system and method.

An example of congestion management at a destination host through a negative acknowledgment protocol will be explained with reference to FIG. 5, which illustrates a flow diagram between a source host 502 and a destination host 504. In the exemplary scenario 500, communication handles 502_comm and 504_comm may be created on the respective source host 502 and destination host 504. A user level connection 506 is established between the communication handles. The two communication handles 502_comm and 504_comm could also be on the same host.

In block 508, the source host 502 may send packet data to the destination host 504. The transport system may maintain a send message table to store the state information of all in-flight messages and a send packet table for in-flight packets to facilitate flow control and retransmission by the transport layer.

Each packet may be "self-describing" in the sense that it contains message parameters such as the size of the whole message and its offset in the overall message. The packet may also contain connection parameters, such as the source communication handle, target communication handle, instance number, etc. The information may be constructed as packet header information by the network interface controller on the source host in a way similar to the construction of an Ethernet packet header. In addition, the transport system may insert other self-describing information, for example, message identification information and/or order offsets into each packet on the source host before sending out the packets. Since the packets of a sent message may arrive out of order at the destination host, this information enables the transport protocol on the destination side to reserve buffer for a message upon the arrival of any packet of the message without waiting for the head-of-queue packet to arrive. In this way, more efficient buffer utilization on the receive side may be achieved.

In block 509, the transport system at the destination host 504 receives the packets sent by the source host 502. In block 510, it is determined, if the packet that arrived at the destination host is the first packet received for a new message. If the received packet is not the first packet but an expected packet for a message already in flight, the transport system places the packet into a buffer area that has been designated for that particular message in block 512. The transport system may manage a receive message table to maintain the state information for multi-packet in-flight messages. The receive message table may record message parameters and information such as bytes received and message sequence number for each multi-packet message.

Acknowledgment messages are sent to the source host for packets received into the destination side buffer pool. A receive packet table may be used by the destination transport layer to maintain the state information for packets that need to be acknowledged based on the acknowledgment threshold. Once the source host receives the acknowledgment, it advances the flow control window accordingly to allow more packets to be dispatched to the acknowledging destination host. The acknowledgment may be an unreliable message and does not consume any packet sequence number or go through the message level flow control.

If the received packet is determined to be the first packet of a new message, the transport system at the destination host may check the packet for validation. Ghost or duplicate packets may be discarded in this step. If the packet is valid, the system determines, in block 514, if the receive resources associated with communication handle 504_comm has enough free space for the new message. To be able to receive the whole message, the receive region should have enough free space in all the data structures in the receive region. For example, there should be enough free space in the buffer pool, such as buffer pool 410 in FIG. 4, for the whole message. There should also be space for an associated anchor structure. In addition, the receive region should also have available slots for the new messages in the completion queue. In the present example, the reservations of the completion queue entry, of the anchor and of the free buffer space are made together upon the arrival of a first packet of a message. The anchor may or may not come from the free space pool (e.g., space 410), especially when the anchor needed is large and may be dynamically allocated or freed for large messages.

If it is determined that enough receive resources exist, the transport system reserves space in the buffer pool and in the completion queue, and allocates an anchor structure to receive the new message in block 516. Then the process returns to block 509 and continues to receive the subsequent packets of the message and packets from other messages. As subsequent packets of the expected message arrive, they are assembled into the allocated buffer for the message. The process continues receiving the remaining packets of the new message. When all the packets of the message have arrived, the anchor is added to the completion queue. The completed message is ready to be consumed by the application process that owns the destination communication handle. The application process may learn the completion of a message by checking the completion queue 414 periodically. Alternatively, the transport system may notify the application process when the anchor is added through some wakeup event. Once the application process incorporates the completed message into the ongoing computation, it handshakes with the transport layer to return the receive buffers (through a shadow queue such as 416), which can be reused for new messages.

In block 518, if it is determined that there are not enough receive spaces for a new message, the transport system drops the packet and sends a negative acknowledgment message to the source communication handle 502_comm indicating that the destination handle 504_comm is congested. The condition of no-free-receive-space may be triggered when the transport layer determines that there is not enough buffer pool for the entire message, or when there is no available entry in the completion queue or when no space exists for an anchor structure. Since receive space is allocated for the entire message upon receipt of the first message packet, this condition is only triggered upon the arrival of the first packet of a new message. The destination transport system may keep the state information of the dropped message in order for the system to recognize the subsequent packets of the message and to drop the packets. Although the congestion at the destination side may have cleared by the time subsequent packets of the dropped message arrive, these packets, as part of the dropped message, are not going to be accepted by the destination side.

The negative acknowledgment packet may include a message identification and a sequence number of the dropped packet to enable the source host to clean up send side data structures and perform flow controls. It may also include a reason code indicating the out-of-free-buffer condition on the destination host. Since various reasons may result in a failure of delivery, a reason code provided in the negative acknowledgment allows the sending host to make the appropriate decision to pause retransmission of packets to the congested destination host until a resume message is received.

As previously discussed, each communication handle may be connected with multiple remote communication handles through multiple connections. Although only one connection 506 is shown in FIG. 5, it should be understood that the destination handle 504_comm may have multiple connections with other remote source hosts that either reside on node 502 or on other network nodes. The incoming messages from these connections share the receive "page" associated with destination handle 504_comm. Therefore, once the transport system detects there is no free resource for handle 504_comm, incoming new messages from these connections will be similarly dropped and negative acknowledgments will dispatched to these remote source hosts. The transport system may maintain a list of these connections to keep track of the source hosts to which the negative acknowledgments have been sent. Once the congestion is cleared up, resume messages may be dispatched to all the source hosts to request retransmission of the dropped messages and resumption of transmissions of new messages.

The transport system at the destination host continues to discard the remaining in-flight packets of dropped messages, and sends negative acknowledgment for each of the discarded packets. The negative acknowledgment, like the acknowledgment packets, may be an unreliable message. Thus, the source host continues retransmitting the dropped packets for which the negative acknowledgments were issued until receiving the corresponding negative acknowledgments. In block 520, upon receiving the negative acknowledgment from the destination host, the source host pauses transmitting new messages over connection 506 and other connections to the destination communication handle 504_comm. However, remaining packets of those messages that have already been received and allocated with buffer space at the destination host are allowed to be transmitted and will be accepted by the destination transport. This ensures that these messages complete and the allocated buffer spaces to be returned to the transport. Connections between the communication handle 502_comm and other remote communication handles are not affected, and the communications over these connections may continue.

The transport system also performs various clean-up operations at the source host. For example, the status of the destination communication handle 504_comm may be marked as "congested" and all connections to the congested endpoint may be updated to "blocked". Messages destined to these blocked connections are all blocked as well.

Flow control state of the dropped message is also updated at the source host. Based on the packet sequence number in the negative acknowledgment, this may be done through a look-up to the in-flight send packet tables and a reset of the state of the corresponding packets in the tables. Since the flow control window on the source node is shared by multiple communication connections, this ensures the flow control window is not blocked by one congested connection and messages could continue to flow over the transport channels between other pairs of communication handles on the same hosts 502 and 504.

In addition, the transport system may also free the entries of the dropped messages in the in-flight send message table, and update the message status in a pending send queue, such as the priority queue 322a, to indicate that these messages need to be retransmitted. These messages may only be moved back to the in-flight message table when a "resume" notification is received that the congestion at the remote communication handle is cleared. The above operations may be performed for all the pending messages in the in-flight send message table destined to the congested remote communication handle 504_comm, so the entries of these messages in the send message table are freed and their status in the pending send queue are similarly updated.

On the destination side, the application process that owns the communication handle 504_comm continues harvesting the completed messages and returns the freed buffer to the transport layer in block 522. The transport system monitors the size of the free space associated with 504_comm in block 524. If it determines that the free space is sufficiently large (e.g., above a predetermined threshold value), it sends a resume message to each of the source host that have messages dropped because of the congestion at 504_comm. Since the resume message transmission is only triggered by the destination communication handles's state change from "congested" to "non-congested" and the loss of a resume message does not trigger a re-transmission of the resume message, the resume message should be a reliable message.

As discussed above, all source hosts connected to the congested destination host stop sending data over the congested connections upon receiving the negative acknowledgments. If the number of blocked connections is large, the transport system may schedule dispatching the resume messages to these source hosts on a staged basis in order to prevent a flood of incoming messages as a result of concurrent resumed connections, which may bump the destination communication handle back to the congested state. The staging order may be based on the priority information of the dropped messages, which is maintained by the destination host.

The source host, upon receiving the resume message, updates the status of all dropped and paused messages. In block 526, these messages are moved from the pending send queue back to the in-flight message table to be re-transmitted by the source host 502 and received by the destination host 504. Each re-transmitted message and packet is assigned with new sequence numbers in the flow control window. Communication handle 504_comm continues receiving packets of the dropped and blocked messages in block 509.

It should be noted that since a connection between two communication handles may be bi-directional and each communication handle may send data to and receive data from the other communication handle, congestion due to out-of-free-receive-buffer at one communication handle as a receiving side does not stop sending by the congested communication handle or receiving at the other uncongested communication handles. For example, while one communication handle, e.g. 502_comm, pauses sending data in response to a negative acknowledgment from destination side 504_comm, 504_comm as a sending side, may continue sending data to 502_comm as a destination side. Destination 502_comm may also continue receiving data from source 504_comm unless destination 502_comm becomes congested.

Figure 6:
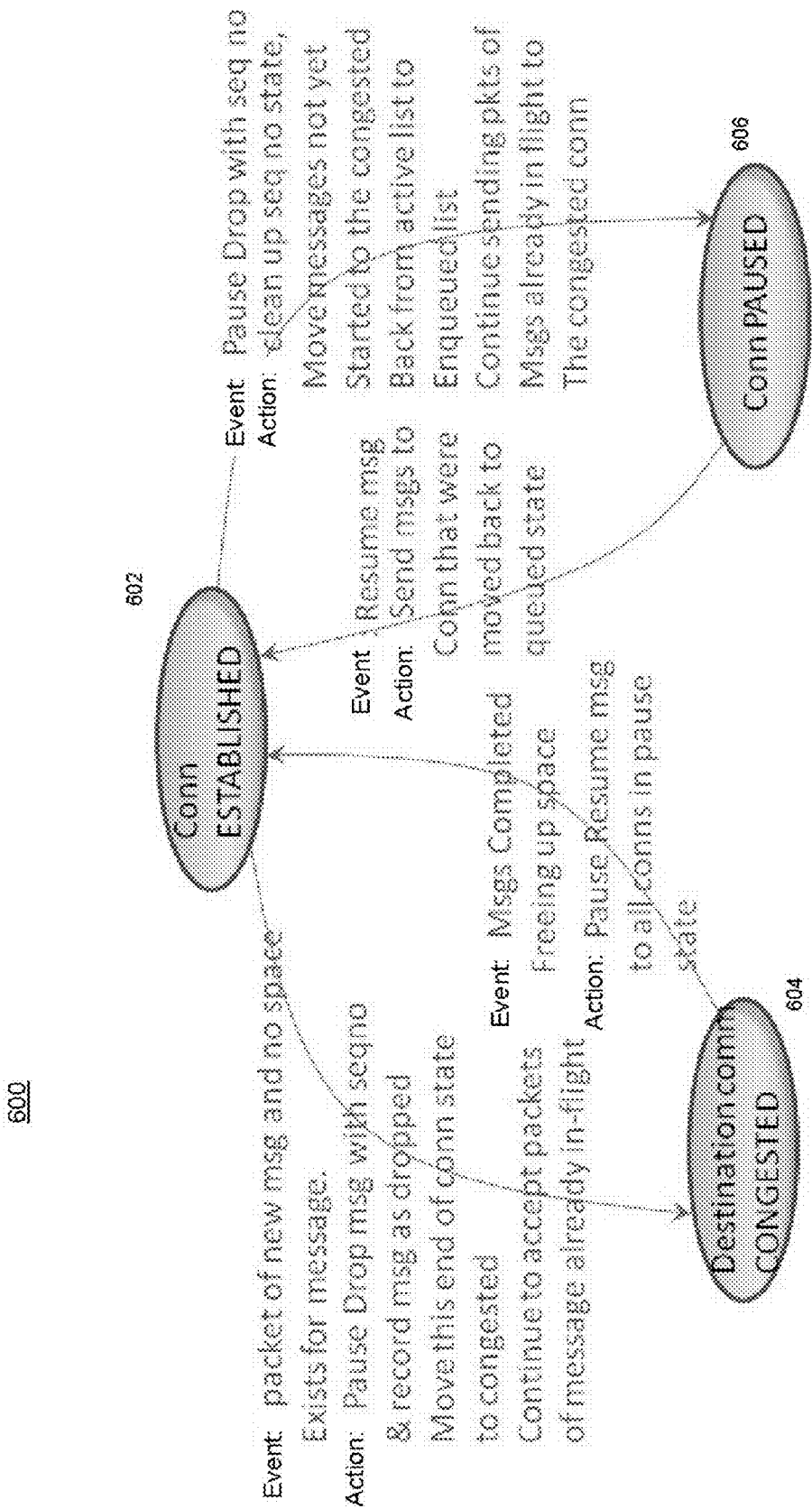
FIG. 6 illustrates a state transition diagram in accordance with an aspect of the system and method.

FIG. 6 illustrates a state transition diagram according to aspects of the invention. The state transition scenario 600 may apply to a scenario similar to 500 depicted in FIG. 5. In state 602, a connection between two communication handles on source host and destination hosts is established. The destination communication handle may also be connected with other source communication handles. Upon a detection of no free receive buffer space for a new message on the destination communication handle, the destination communication handle enters a congested state 604. The destination host starts to drop all the incoming messages sent to the congested destination communication handle. It also sends negative acknowledgment with the sequence numbers of the dropped messages to all the source hosts that sent the dropped messages.

Upon receiving the negative acknowledgment, the source communication handles pause sending new messages to the congested destination communication handle. The connection now enters the paused state of 606. Each paused source communication handle also moves messages from the active sending queue to a pending queue for that connection, and continues sending packets for messages already in-flight to the congested destination communication handle.

As the application process that owns the congested destination communication handle absorbs completed messages, receive buffer space is freed. When the free buffer space reaches a certain threshold, the congested destination communication handle leaves the congested state 604 and sends a resume message to all the source communication handles it had sent into the paused state. Once a source communication handle receives a resume message, the connection between it and the destination communication handle switches back to the established state 602 from the paused state 606.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Aspects, features and advantages of the invention will be appreciated when considered with reference to the above description of exemplary embodiments and accompanying figures. The same reference numbers in different drawings may identify the same or similar elements. Furthermore, the above description is not limiting; the scope of the invention is defined by the appended claims and equivalents.

Unless expressly stated to the contrary, every feature in a given embodiment, alternative or example may be used in any other embodiment, alternative or example herein. For instance, any suitable transport protocol may be employed in any configuration herein. Various types of handshake mechanisms between the transport layer and the user application programs may be used in any configuration herein. Various data structures may be used with any of the configurations herein.

It will be further understood that the sample values, types and configurations of data described and shown in the figures are for the purposes of illustration only. In that regard, systems and methods in accordance with aspects of the invention may include various types of networks, transmission devices, communication endpoints, servers, data values, data types and configurations, and different transport protocol techniques. The systems and methods may be provided and received at different times (e.g., via different servers or databases) and by different entities (e.g., some values may be pre-suggested or provided from different sources).

The invention claimed is:

1. A computer-implemented method for congestion control in a data communications network, the method comprising:
  receiving, at an endpoint, a first arrived packet of a message for a communication handle associated with the endpoint, the message having a plurality of packets where each packet of the plurality contains message size information and information of the communication handle;
  determining, by a processor of the endpoint, that a receive memory buffer associated with the communication handle does not have enough free space to store all of the plurality of packets, based on the message size information of the first arrived packet;
  when the receive memory buffer does not have enough free space to store all of the plurality of packets, dropping the message including all of the plurality of packets;
  when the message has been dropped, sending first data to a sender of the dropped message to pause data transmission to the communication handle, wherein the first data is a negative acknowledgment of the first arrived packet;
  after dropping the message, when the receive memory buffer has enough free space to store all of the plurality of packets, (1) sending second data to the sender to resume the data transmission to the communication handle and (2) allocating buffer space, by the processor, in the receive memory buffer;
  after sending the second data, accepting the plurality of packets into the allocated buffer;
  dropping subsequent messages sent to the communication handle after the first arrived packet of the dropped message;
  sending a negative acknowledgment to each respective sender of any dropped subsequent message; and
  sending the second data to each respective sender of any dropped subsequent message that has been negatively acknowledged when the receive memory buffer has enough free space to store the dropped subsequent message for that respective sender.

2. The method of claim 1, wherein sending the first data to a sender of the dropped message includes sending a negative acknowledgment for each packet of the plurality of packets to the sender of the dropped message.

3. The method of claim 1, wherein, after dropping the message, the method further comprises:
  continuing data transmission from the communication handle;

accepting incoming packets of messages already accepted; and accepting new messages that are not destined for the communication handle.

4. The method of claim 2, further comprising the processor recording information of the dropped subsequent messages at the endpoint.

5. The method of claim 1, wherein the communication handle is associated with an application process running on the network node.

6. The method of claim 5, wherein the application process comprises a plurality of application processes running, each of the plurality of application processes being associated with a unique communication handle, and each unique communication handle being associated with a unique receive memory buffer.

7. The method of claim 5, further comprising:
moving accepted messages into the application process;
freeing buffer space in the receive memory buffer occupied by the accepted messages; and
monitoring the size of the freed buffer space to determine if the receive memory buffer has enough space to store the dropped message.

8. The method of claim 7, wherein the application process has read and write access to a send memory buffer associated with the communication handle and read-only access to the receive memory buffer.

9. The method of claim 1, further comprising setting up the receive memory buffer for the communication handle upon opening of a transport channel between the endpoint and another endpoint on another network node, including:
pinning the receive memory buffer; and
associating the pinned buffer with the communication handle.

10. A system for managing a memory buffer in a data communications network, the network including an endpoint on a transport layer on a network node, the endpoint being associated with a communication handle, the system comprising:
a receive memory buffer for receiving data sent to the communication handle;
a processor on the network node the processor being configured to:
receive, at the endpoint, a first arrived packet of a message for the communication handle from the endpoint, the message having a plurality of packets where each packet of the plurality contains message size information and information of the communication handle;
determine, based on the message size information of the first arrived packet, that the receive memory buffer does not have enough free space to store all of the plurality of packets;
when the receive memory buffer does not have enough free space to store all of the plurality of packets, dropping the message including all of the plurality of packets;
when the message has been dropped, send first data to a sender of the dropped message to pause data transmission to the communication handle;
after dropping the message, when the receive memory buffer has enough free space to store all of the plurality of packets, (1) sending second data to the sender to resume the data transmission to the first communication handle and (2) allocate buffer space in the receive memory buffer when the receive memory buffer has enough free space to store the message;

after sending the second data, accept the plurality of packets into the allocated buffer;
drop any subsequent message sent to the communication handle after the first arrived packet of the dropped message;
send a negative acknowledgment to each respective sender of any dropped subsequent message; and
send a notification to each respective sender of any dropped message that has been negatively acknowledged when the receive memory buffer has enough free space to store the dropped subsequent message for that respective sender.

11. The system of claim 10, wherein the receive memory buffer is configured to store a first completion queue and a second completion queue, the first completion queue being configured for use by the application process to accept incoming messages and the second completion queue being configured for use by the application process to return buffer space occupied by the accepted messages to the transport layer.

12. The system of claim 10, wherein the receive memory buffer stores an anchor, the anchor containing pointer to buffer space in which the message are stored.

13. The system of claim 10, wherein the processor is further configured to set up the receive memory buffer for the communication handle upon opening of a transport channel between the endpoint and another endpoint on another network node, wherein the set up comprises pinning the receive memory buffer and associating the pinned buffer to the communication handle.

14. A destination congestion management system including a first endpoint on a transport layer of a first network node, a second endpoint on the transport layer of a second network node, the first and second endpoints communicating via a transport channel for data transmission therebetween, the second endpoint being associated with a communication handle, the system comprising:
a first processor on the first network node, the processor configured to:
pause data transmission to the communication handle upon receiving first data at the first endpoint; and
resume data transmission to the communication handle upon receiving second data at the first endpoint;
a communication interface for receiving, at the second endpoint, a first arrived packet of a message transmitted from the first endpoint to the communication handle, the message including a plurality of packets where each packet of the plurality contains message size information and information of the communication handle;
a second processor coupled to a receive memory buffer on the second network node; and
a second processor configured:
determine, based on the message size information of the first arrived packet, whether the receive memory buffer has enough free space to store the message;
when the receive memory buffer has enough free space to store all of the plurality of packets:
allocate buffer space in the receive memory buffer, and
accept the first arrived packet and other packets of the message into the allocated buffer; and
when the receive memory buffer does not have enough free space to store all of the plurality of packets:
drop the message and any subsequent messages sent to the communication handle after the first arrived packet of the dropped message;
when the message has been dropped, send the first data to the first endpoint, send a negative acknowledgment to each respective sender of any dropped subsequent message, when the receive memory buffer has enough free space to store all of the plurality of packets send the second data to the first endpoint, sending the second data to each respective sender of any dropped subsequent message that has been negatively acknowledged and any dropped subsequent message that has been negatively acknowledged when the receive memory buffer has enough free space to store the dropped subsequent message for that respective sender.

15. A non-transitory, tangible computer-readable storage medium on which computer readable instructions of a program are stored, the instructions, when executed by a processor, cause the processor to perform a method for congestion control in a data communications network, the method comprising:

receiving, at an endpoint, a first arrived packet of a message for a communication handle associated with the endpoint, the message having a plurality of packets where each packet of the plurality contains message size information and information of the communication handle;

determining, by a processor of the endpoint, that a receive memory buffer associated with the communication handle does not have enough free space to store all of the plurality of packets, based on the message size information of the first arrived packet;

when the receive memory buffer does not have enough free space to store all of the plurality of packets, dropping the message including all of the plurality of packets;

when the message has been dropped, sending first data to a sender of the dropped message to pause data transmission to the communication handle;

after dropping the message, when the receive memory buffer has enough free space to store all of the plurality of packets, (1) sending second data to the sender to resume the data transmission to the communication handle and (2) allocating buffer space, by the processor, in the receive memory buffer;

after sending the second data, accepting the plurality of packets into the allocated buffer;

dropping subsequent messages sent to the communication handle after the first arrived packet of the dropped message;

sending a negative acknowledgment to each respective sender of any dropped subsequent message; and sending the second data to each respective sender of any dropped subsequent message that has been negatively acknowledged when the receive memory buffer has enough free space to store the dropped subsequent message for that respective sender.

16. The medium of claim 15, wherein the first data is a negative acknowledgment of the first arrived packet.

17. The medium of claim 15, wherein the method further comprises sending the first data to a sender of the dropped message by sending a negative acknowledgment for each packet of the plurality of packets to the sender of the dropped message.

18. The medium of claim 15, wherein, after dropping the message, the method further comprises:

continuing data transmission from the communication handle;

accepting incoming packets of messages already accepted; and accepting new messages that are not destined for the communication handle.

19. The medium of claim 18, wherein the method further comprises the processor recording information of the dropped subsequent messages at the endpoint.

20. The medium of claim 15, wherein the communication handle is associated with an application process running on the network node.

21. The medium of claim 20, wherein the method further comprises:

moving accepted messages into the application process;

freeing buffer space in the receive memory buffer occupied by the accepted messages; and monitoring the size of the freed buffer space to determine if the receive memory buffer has enough space to store the dropped message.

22. The medium of claim 15, wherein the method further comprises setting up the receive memory buffer for the communication handle upon opening of a transport channel between the endpoint and another endpoint on another network node, including:

pinning the receive memory buffer; and associating the pinned buffer with the communication handle.

* * * * *